United States Patent [19]

Lingg et al.

[11] 3,776,395

[45] Dec. 4, 1973

[54] CONVEYOR SYSTEM WITH PALLETS, PREFERABLY FOR AIRPORT BAGGAGE HANDLING

[75] Inventors: Gerhard Lingg, Leimen; Eberhard Hellermann, Morfelden, both of Germany

[73] Assignee: Mannesmann Aktiengesellschaft, Dusseldorf, Germany

[22] Filed: Feb. 10, 1972

[21] Appl. No.: 225,245

[30] Foreign Application Priority Data
Feb. 17, 1971  Germany.................. P 21 07 489.5

[52] U.S. Cl. ............ 214/6 BA, 214/6 P, 214/8.5 R, 214/310, 198/35
[51] Int. Cl. .......................................... B65g 60/00
[58] Field of Search ................... 214/6 R, 6 P, 6 H, 214/6 BA, 6 A, 8.5 R, 309, 310, 300; 198/35, 38

[56] References Cited
UNITED STATES PATENTS

| | | | |
|---|---|---|---|
| 3,113,683 | 12/1963 | Von Gal, Jr. ..................... | 214/6 BA |
| 3,160,292 | 12/1964 | Albrecht........................... | 214/6 BA |
| 3,181,712 | 5/1965 | Von Gal, Jr. ..................... | 214/6 BA |
| 3,412,874 | 11/1968 | Shiffer .............................. | 214/6 A |
| 3,448,867 | 6/1969 | Raynor et al. .................... | 214/6 BA |
| 3,478,897 | 11/1969 | Dykeman ......................... | 214/6 BA |
| 3,583,580 | 6/1971 | Dean ................................ | 214/6 BA |
| 3,610,159 | 10/1971 | Fickenscher ...................... | 198/38 |

*Primary Examiner*—Robert J. Spar
*Attorney*—Ralf H. Siegemund

[57] ABSTRACT

Conveyor system with plural branches and return path portions for operation in an overall closed loop configuration, there being pallets on the conveyor system circulating in the closed loop and receiving individual items of load to be transported, the conveyor system having individual loading stations for pallets and unloading stations for loaded pallets, from which the empty pallets return to the loading stations. The closed loop including a portion of the conveyor system that is common for return of pallets for several of the unloading stations to several of the loading stations. A pallet stacking station is disposed behind unloading stations for feeding stacks of empty pallets into that common portion, and a pallet unstacking station is disposed in front of the loading stations, receiving stacks of empty pallets and unstacking them for individual availability of emtpy pallets in the loading stations, so that only loaded pallets circulate in the system, loaded either with load proper or with other, empty pallets.

5 Claims, 4 Drawing Figures

PATENTED DEC 4 1973　　　　　　　　　3,776,395

CONVEYOR SYSTEM WITH PALLETS, PREFERABLY FOR AIRPORT BAGGAGE HANDLING

The present invention relates to an automatically operated conveyor system for pallets which are an integral part of the conveyor system. The system includes switches and branch lines and operates in predetermined directions as to pallet propagation. More particularly, the invention relates to baggage handling facilities, such as the transportation and distribution of luggage in airports, using baggage or luggage pallets of trough-shape configuration.

The capacity of such a conveyor system is determined by several criteria and parameters. Among them is the speed of the conveyor belt or roller system as determining the propagation speed of the individual pallets; another parameter is a minimum distance between the individual pallets, bearing in mind, that such pallets should at times be switched into or out of a prescribed path, from or into branch lines. The individual propagation path for a pallet is determined by using, for example, encoding use for control of the switches that identify an individual route.

However, it must not be forgotten that the pallets have to be returned; in other words, such a system operates in a closed loop configuration in the general sense. Each pallet must be able to return to any point of origin; each pallet after unloading must become available again for reloading; each pallet, therefor, circulates in the system. Here it has to be born in mind that empty pallets are not just taken off the conveyor system and stacked or otherwise stored and brought back whenever needed. Therefore, another criterium for the capacity of such a system as a whole must include the requirement of returning empty pallets. It can readily be seen that the return path to be provided from unloading to the reloading zone or zones will have at least approximately the same length as the transport path for the loading. If, therefore, the conveyor path as a whole includes loaded as well as unloaded pallets, the total capacity per unit length of the entire conveyor path is used only by about 50 percent for load transport, because about half of the capacity is taken up by the return path This consideration remains true, even if loading stations and unloading stations are interspersed so that portions or all of the conveyor systems train are used for moving loaded as well as unloaded pallets.

It is an object of the present invention to provide a conveyor system in which the particular relative portion of conveyor system capacity needed for returning empty pallets, is considerably reduced, so that the entire capacity of the conveyor system, and particularly the useful capacity per unit length, is increased accordingly. In accordance with the preferred embodiment of the present invention, it is assumed that there is at least one loading station and at least one unloading station for pallets; the loading station is preceded, in direction of conveyor movement, by an unstacking station or device, while the pallet unloading station is succeeded by a pallet stacking device or station, so that only load bearing pallets or pallets loaded with other empty pallets circulate in the system. One can, therefore see, that it is a principal of the present invention to convert a portion of the conveyor system loop into a two-dimensional system. The individual conveyor system, as far as the individual pallets are concerned, can be regarded as a one-dimensional system, wherein pallets are transported serially and in sequence along the conveyor system line. Now, in accordance with the invention, the return path is to be shortened by using a two-dimensional system in that pallets are returned in parallel, i.e., stacked configuration. As a consequence of the invention, there is established a considerable saving in conveyor path portions that are occupied by empty pallets only. This goal is obtained by using stacking and unstacking devices.

For the system to be effective in that manner, there should be plural loading and plural unloading stations and it should be possible to provide for a common return path portion for at least some of these stations. In case of one loading and one unloading station, the invention can still be practiced if the return conveyor track has lower speed. An optimum of capacity utilization can be determined on basis of the specific conditions such as track configuration, number of loading and unloading stations and number of pallets to be stacked and to be returned in stacked configuration. The gain in track length saving is not necessarily directly proportional to the height of the pallet stacks, as the stacking and unstacking stations are an additional expense. Also, high stacks may compell a reduction in speed, particularly if there are sharp curves in the conveyor train.

Considering these various factors, and considering that the conveyor speed should not be reduced, it was found that, for example, the usual pallets as they are used in airports should be stacked so that an otherwise empty pallet carries up to three or four additional empty pallets, not more.

Stacking and unstacking devices are complementary and similar and in accordance with the present invention, it is suggested to use a section of the conveyor track and to provide a lifting device thereat. The track occupied or involved in that manner should have about the length of a pallet. An arrangement including pivotal pawls is provided above that track section for accumulating pallets in a stack or dispensing and releasing individual pallets from a stack. The particular section of the conveyor track system itself could be a component (platform) of the lifting device. This offers the advantage that the lifting function needed for stacking or unstacking can be combined with a level change in the track itself. The liftable track section is relatively heavy and requires a sufficiently sturdy track construction. In order to avoid too heavy constructions, one may simply provide a pair of load bearing bars which dip into or penetrate the stationery section of the conveyor track. This, however, makes it impossible to use the device for changing the level of the track.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
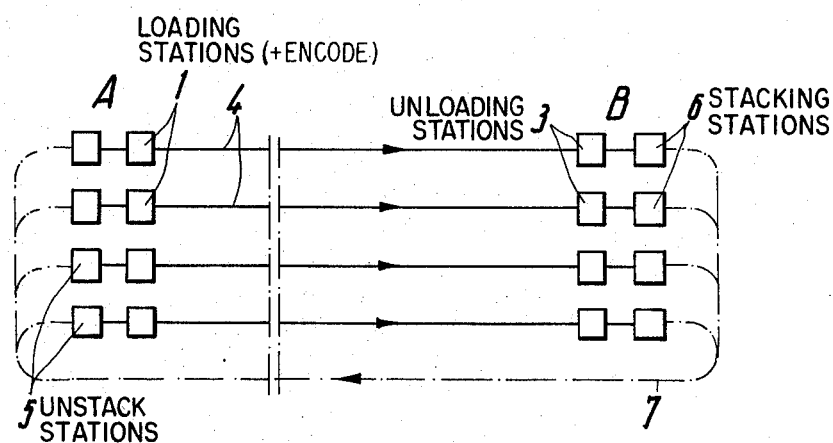
FIG. 1 illustrates schematically a plan view of a closed loop type conveyor system with plural parallel conveyor path branches and a single return path for pallets.

Proceeding now to the detailed prescription of the drawings, we turn first to FIG. 1. Reference character A refers to a loading section for pallets. The loading section or area includes plural loading stations, each identified by reference numeral 1. The pallets rest on a conveyor track which may be constructed either as a roller conveyor or as a conveyor belt type system. The invention is applicable to either type of conveyor system.

Figure 4:
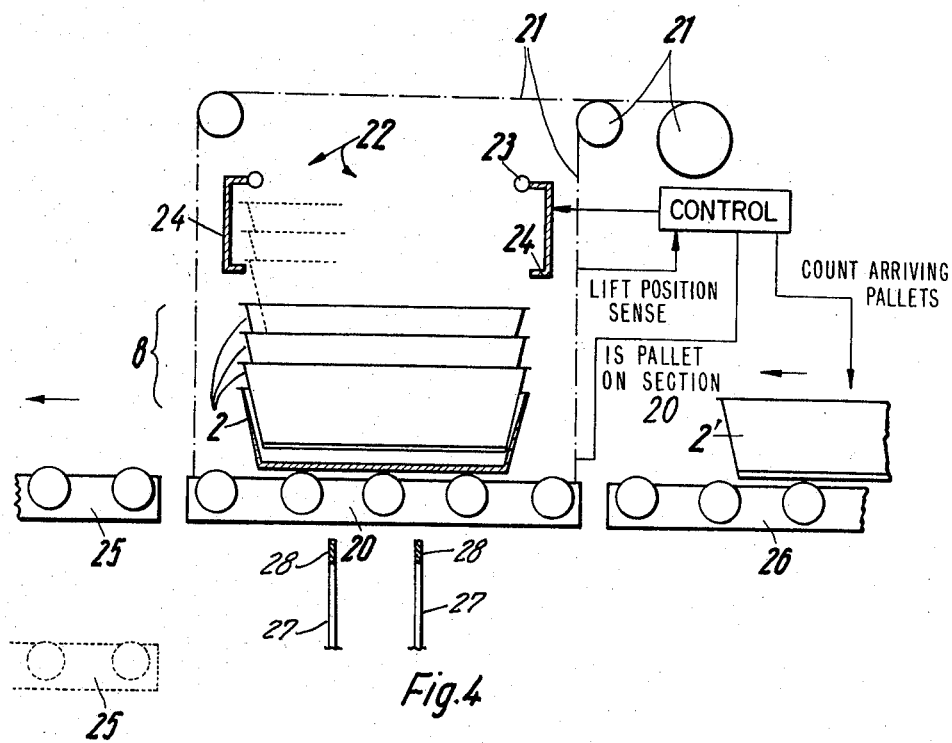
FIG. 4 illustrates somewhat schematically equipment that can be used for stacking as well as for unstacking of the empty pallets.

The individual pallets are shown as pallets 2 in FIG. 4, and they are loaded in stations 1. The pallets are loaded in these stations independently from each other. This is not a necessity but a possibility. An example for such a loading station is, for example, disclosed in copending application Ser. No. 225,057, filed Feb. 10, 1972 of common assignee. However, the pallets may be loaded by hand.

The loaded pallets move on the conveyor track and the Figure shows plural conveyor path branches 4. These track or train branches 4 are shown in parallel but this in only an illustrative facilitation; physical parallelism is, by no means, required. The arrows in FIG. 1 illustrate schematically the direction of conveyor path movement in each branch.

Reference numeral 3 refers to unloading stations in an unloading section B. The said application Ser. No. 225,057 filed Feb. 10, 1972 discloses also aspects for such unloading stations. However, the pallets may be unloaded by hand or other conveyor belt ramps etc. The capacity of each of these conveyor track branches 4, is limited by speed and required minimum distance of the pallets thereon. In the schematic system, shown in FIG. 1, there are provided four such individual conveyor branches, each branch extending between a loading station in section A to an unloading station 3 in section B.

Now, the loading station 1 in each of the branches are preceeded by a destacking device 5, whereas behind each unloading station there is provided a pallet stacking device 6.

All stacking and all unstacking stations and devices are connected through switches to a single return branch track 7 for empty pallets. The four branches 4 all branch off the end portion of return path 7, there being switches interposed. Conceivably, these switches are manually operated by the clerk of a loading station. Whenever he sees that he runs out of pallets, he operates the switch to receive the next stack of empty pallets. Alternatively, the fact that the last pallet is being used in a loading station may be automatically sense just by detecting absence or presence of pallets in the respective preceding unstacking station 5, so that the switch be operated to branch off the next stack from the return path. If the conveyor system has the same speed in branches 4 as well as in the return path 7, full capacity is obtained, if each pallet that moves directly on return path 7, carries three other pallets. It can readily be seen that in case stacking and unstacking stations were not there, the same number (four) of return path branches would be required as there are branch portions that carry loads. In such case, then, the total number of the conveyor path branches that span the distance from section A to section B would be eight rather than five and in such case the useful load carrying portion of the entire conveyor system would be only 50 percent. However, in the illustrated system, the load bearing branches constitute about 80% of the total conveyor system. If, for example, another load bearing branch were added and if, therefore, each pallet returning on the path 7 carries four empty pallets, the conveyor speed would already be somewhat limited and, in fact, the increase in the relative load bearing portion would be increased to only 83 percent, while 25 percent more of the stacking and unstacking devices were needed. Therefor, the system shown in FIG. 1 with four load bearing conveyor path branches and one return path is about or close to a reasonable optimum.

Figure 2:
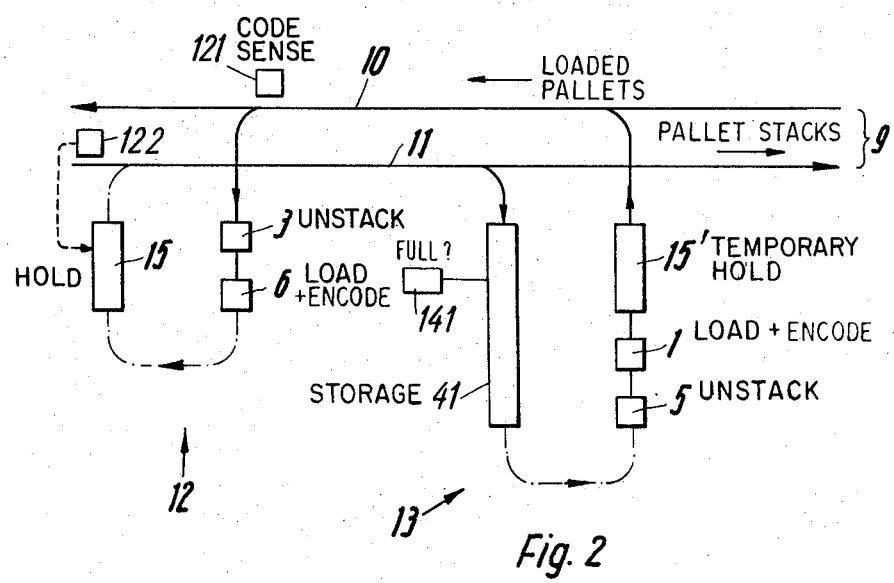
FIG. 2 illustrates in similar view an endless type conveyor system of indefinite length with switching of pallets into and out of oppositely directed path portions.

The invention can be practiced in a system as shown in FIG. 2, but in a somewhat different manner. It is assumed that an endless conveyor line system 9 is provided, which means that the system has basically indefinite length. The system has a first track portion 10 for movement of pallets in one direction and a second track portion 11 for movement in the opposite direction. Load bearing and empty pallets may run on either of the tracks, i.e., there is not necessarily a definite direction for transportation of useful load and for return of empty pallets. However, in the specific example or illustrated subsystem, load bearing pallets are assumed to arrive on track 10, empty pallets move along track 11, but this rule has been adopted only for facilitation of explanation.

Therefore, this conveyor system 9 is a bi-directional conveyor system of general configuration and usefulness, and in certain portions loaded or unloaded pallets are to be switched off one branch and returned as empty or loaded pallets for movement in the opposite direction, or vice versa. For example, there are several sub-loops or branch loops, such as 12 and 13. Loop 12 is provided for unloading pallets that arrive loaded on track 10 and are returned empty through track 11. Branching loop 13 is provided to load empty pallets that may arrive on section 11 and are to be passed on, loaded, via track section 10.

Loop 12 is established and includes an input branch that is connected through a switch to the conveyor track 10. As, for example, disclosed in U.S. Pat. No. 3,610,159 and others, pallets may be provided with code markings defining the destination of a loaded pallet. A sensor or reader 121 of the type disclosed in that patent may be disposed along track 10 to operate the switch that leads into this particular loop 12 when the encoding on the pallets states that loop as the destination for the pallet.

As far as the loop is concerned, first on loop 12, there is provided an unloading station 3, followed by a pallet stacking station 6, which, in turn, is followed by a buffer and waiting section 15. Stacks of empty pallets can be properly switched into the track 11. A sensor 122 may respond to passing pallets on track 11 and whenever there is a space available in between the pallets that propagate thereon. Alternatively, the switching into track 11 can be done manually.

Loop 13 is provided for loading. First, in the loop there is a storage section 14 occupied by stacks of empty pallets. The stackes of empty pallets arrive through a switch from track 11, and are switched into the loop when-ever the need arises. The automatic control conditions may specify, for example, that a minimum number of stacks must always be available in section 14; empty stacks may bypass the loop when the storage section 14 is full. Therefor, a detector 141 simply determines the state of filling of storage section 14 such as how many stacks are backed up in section 14 and operates the switch that leads into loop 13 from empty pallet stack track 11. Pallet stacks, in sequence, pass to an unstacking station 5, dispensing individual, empty pallets to loading station 1. The unstacking station may be manually controlled by the clerk in the loading station. A loaded pallet enters a buffer section 15', controlled for extraction of loaded pallets and insertion into the track section 10 whenever a gap is monitored in track 10 analogous to monitoring the detector 122.

Switching pallets (loaded or stacked) into and out of the various tracks, is carried out automatically and condition responsive. The several switches are shown only schematically and it is readily apparent that pallet sensors are disposed along the tracks monitoring occupancy with pallets as well as destination codes on the pallets. In large systems their control by computer may be necessary, considering all conditions as, for example, different loading loops feeding into the same direction, should not have priority of occupancy just on basis of relative location.

Automatic control makes it possible to utilize the conveyor space at all times at maximum capacity. For example, a pallet having a length of 900 mm may be switched into a gap in between two succeeding pallets of about 1,500 mm. The storage sections such as 14, for example, rid the track from empty pallets and, thus, open up space for placement of others by a station "down stream". In case of a densely loaded track portion, presence of a sufficiently wide gap is monitored continuously to switch a loaded pallet or a stack of pallets into the main track as early as possible. The calculation as to relative occupancy made above with reference to the system in FIG. 1, can be repeated here. The entire track system 9 may be fully occupied at any instance with loaded pallets and stacks of empty pallets, whereby on the average the relative occupancy of the track by non-load bearing pallets is about inversely related to the stack height. Actually, the relative occupancy by empty stacks in the main tracks 10 and 11 may be even lower if there are more stacks in storage sections 14 and 15 than are loaded pallets in waiting section 15.

Assuming, for example, that each non-load bearing pallet, occupying space on the tracks, carries three other empty pallets, 80 percent of a fully occupied track is used for transporting loaded pallets on the average, while stacks of empty pallets occupy only 20 percent of the entire track system. There, it has to be considered that storage section 14 would have to be four times as long, if empty, unstacked pallets passed through that loop.

Figure 3:
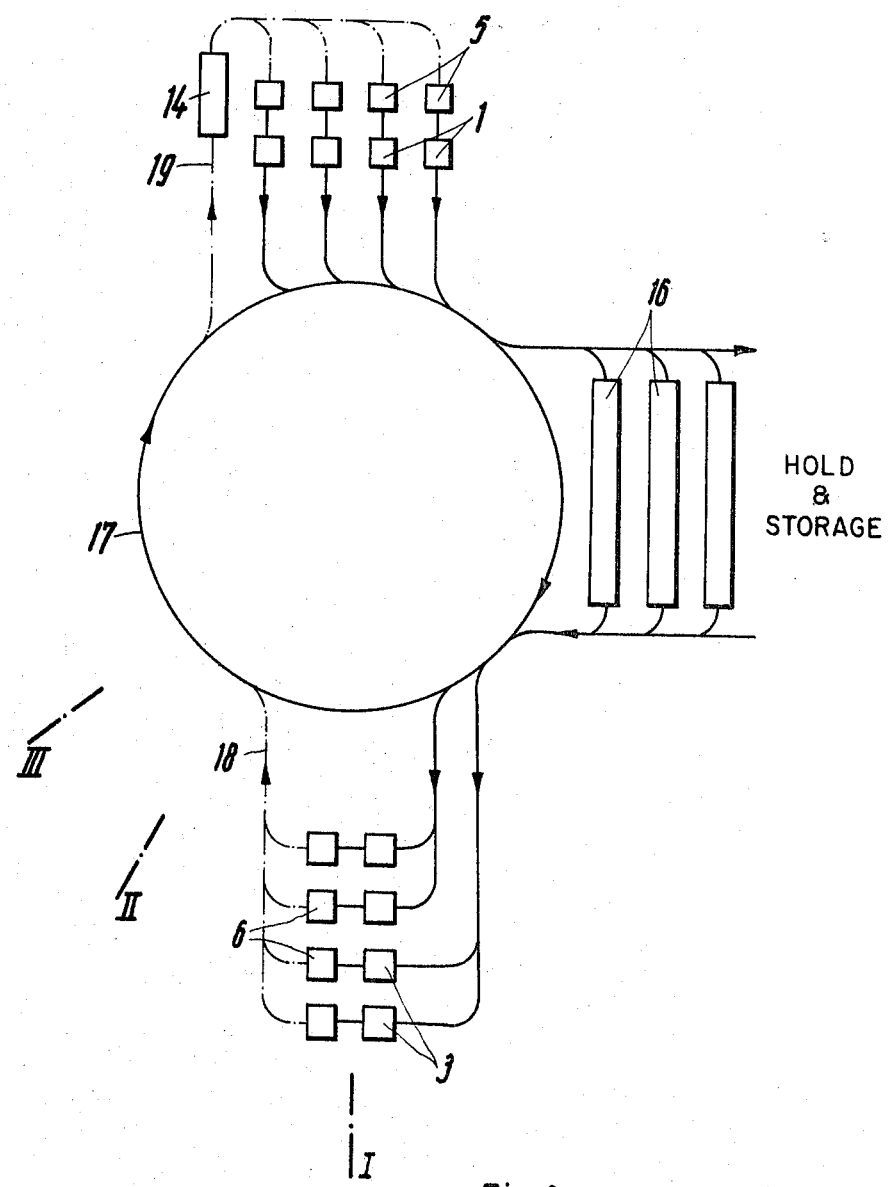
FIG. 3 illustrates schematically and in plan view a representative example for a typical airport baggage handling system with distributor circle.

The system shown in FIG. 3 is a composition of the systems shown in FIGS. 1 and 2. As stated above, the system shown in FIG. 3 is particularly designed for handling baggage in airports. Again, there are provided loading stations 1. They can be of the same type as in any of the other systems. These loading stations may be arranged as part of the check-in equipment, at or near the check-in counters in the airport.

The system includes unloading stations 3, as illustrated, which may, for example, be located near gates and ramps adjacent to the individual aircrafts parked for loading. The illustration is clearly schematical here, as these stations (or pairs or groups of unloading stations) may be located quite far apart. Reference numeral 16 refers to several storage track sections combined in autonomous units.

These three basic major components, loading stations 1, storage sections 16 and unloading stations 3, are combined and united through a distributor or feeder circle 17, that establishes a closed loop. Of course, there may not be an actually circular track configuration. Rather, circle 17 symbolically demonstrates the circulative character of the overall pallet movement in the system.

In the loop system as illustrated in FIG. 3, there is a first sub-loop for extracting empty pallets from the general circulation 17. Extraction runs into return branch portion 19. Stacks of empty pallets are switched out of the circle through branch track 19 and into a relatively small storage section for empty pallets, 14. Storage facility 14 feeds four loading stations 1, operating in parallel.

Each station 1 is preceded by an unstacking station 5; each station 1 returns loaded pallets into the general circulation 17. If storage section 14 is full, stacks of emtpy pallets continue on and are switched off circulation 17 and into one large capacity storage section 16, provided for bulk storage of stacks of empty pallets. When section 14 becomes depleted, the empty pallet storage section 16 is called on, and through general circulation 17 stacks of pallets replenish the supply at storage section 14.

The unloading stations 3 are grouped to illustrate the difference in location of unloading facilities along the path of general circulation 17. Loaded pallets are switched off the circle 17 and unloaded at the individual stations 3. The empty pallets are stacked in stations 6, and switched into a common return of 18 which, in turn, feeds into the general circulation 17 for the return of empty pallets. These empty pallets may be switched into store 14 or continue to the one large store for empty pallets in one of the branches 16.

In case there are additional airplane (satellite) terminals, the unloading zone identified by I has to be duplicated where indicated by II and III. These lines denote the center lines for some systems of that type. The same is true if there are additional loading zones in additional departure hall sections of the airport. The system as a whole must have a particular capacity which is determined to some extent by speed and pallet distance, but also by the physical length of the entire system, which is determined largely by the layout of the airport. If needed, additional, vertically stacked or concentrically disposed "circles" or portions thereof can be provided. Such additional tracks may have opposite circulation as additional loading and unloading facilities may be needed along the extension of the system, e.g. for transporting of transit baggage from one gate to a different gate, or from the gate to the baggage claim area. Thus, loading and unloading stations can be included in that group I, so that actually the return part of that particular loop portion, denoted with reference numeral 18, is not necessarily an empty pallet track, but at times may hold loaded pallets.

As to any individual pieces of luggage, the system shown in FIG. 3 operates in the following manner:

A particular piece of luggage is placed into an empty pallet in one of the loading stations 1. The empty pallet may have been called from the unstacking device 5 that is placed just behind the particular loading station as each unstacking device may serve as local store for empty pallets. The loaded pallet is also destination coded, leaves the loading station, and enters the circulation 17. In accordance with the destination coding, for example, the pallet runs through a portion of the general circulation and is switched off circle 17 in one of the particular sub-loops that feeds unloading. Thereupon the loaded pallets enter the destinated unloading station 3. Here, the baggage is removed from the pallet, and the now empty pallet is lead to the stacking station 6 that follows the particular unloading station in direction of conveyor movement. After several empty pallets have been stacked, the stack of pallets is run into the return or loop exit branch 18, from which it is switched into general circulation 17 for return to the storage section 14. If that section 14 is full, the stack continues to the one bulk store section 16 that holds stacks of empty pallets.

Alternatively, the destination for the particular piece of luggage may require temporay storage in predetermined manner before loading. For example, the luggage may pertain to a later flight not yet ready for service at the particular gate. Therefor, the pallet with that luggage is stored for a while in one particular section 16 until called. That storage section may be provided for accumulation of such luggage until such time the particular flight is serviced at the destination gate.

One can actually see that the total length of the conveyor system that holds empty pallets only, is quite small. Here, it should be considered that the Figure illustrates very schematically a simplified version of a system. As the system may accommodate also baggage transfer from airplanes to possibly different located baggage claim areas, loading and unloading may occur anywhere along general circulation 17, which, thus, holds loaded as well as stacked pallets. Only the dash-dotted track portions are true empty conveyor track branches. A single track general circulation circle may actually slow down the overall baggage handling operation, so that the general circulation may run in plural parallel path, possibly in opposite directions.

Proceeding now to the description of FIG. 4, there is illustrated schematically a particular device that can be used for stacking and unstacking of pallets 2. There are three sections of a roller conveyor track. There is a section 26, a section 20 and a section 25; pallets traverse these three sections in that order. The entire conveyor track facility may have such rollers.

A basic element of stacking equipment is a roller track section 20 having approximately length of a pallet 2. Section 20 is actually suspended by cables 21, as schematically indicated, and pulleys, drums etc. at 21' complete a lifting arrangement for section 20. Thus, a portion of the roller track, namely that section 20, is part of the lifting equipment needed for stacking.

A gripping and suspending device 22 is disposed above the roller section 20. The device 22 has pivotal pawls 24 which are subject to control as to pivoting. The equipment may include four pawls whereby respective two are mounted on an actuator shaft, such as 23. Respective two pawls 24 grip under the rim at the short side of a pallet near opposite ends, so that the four pawls may hold a pallet, which itself may hold up to three stacked pallets 2. The pawls may be pivoted out of the way to release the pallets.

The roller section 20, as illustrated, carries at the present time four pallets, one directly and three are stacked therein. The particular lowest pallet rests directly on the roller bed section 20. Just previously, the situation was that three pallets were held in suspension by pawls 24 and one just came from section 26 and was rolled onto section 20. Now, the section 20 was lifted until the pallet thereon engaged the three pallets that hung in the pawls 24, lifting them slightly off the gripping ends of these pawls. Thereafter, the pawls were briefly pivoted out of the way. Thus, the pawls will release any pallet only when it rests directly or indirectly (through other pallets) on the lifted section 20. Thereafter, section 20 was lowered, now with the four stacked pallets which is the illustrated position.

This stack of pallets is now ready to be rolled onto section 25. The FIG. 4 illustrates the particular instant when section 20 had been lowered again and the stack of pallets is just about ready to be rolled off onto section 25. Section 25 stands, thus, representative of return track portion 7 in FIG. 1, or the input side for the waiting section 15 in FIG. 2, or the return branch 18 in FIG. 3.

As can be seen in FIG. 4, another pallet (2') is just about to arrive and will locate on section 20 by the time the stack has rolled off. After this particular pallet 2' rolls onto section 20, it will be stopped and section 20 will be lifted. Pawls 24 will briefly be pivoted outwardly so that the pallet rim can pass. When the pallet is in position, the pawls pivot back so that the pallet now hangs in the suspension system 22. Section 20 is lowered again, as the next pallet may arrive shortly. It will be handled similarly, except that upon lifting, it will also lift the pallet 2' that already hangs in the system 22, off the pawl, and this respective last pallet will be hung, directly by its rim in the pawls while the pallet that hung previously in the pawls will now be seated in the last one that was hung.

Respective three empty pallets arriving in succession will be so hung one after the other. Only every fourth pallet will not be rehung; instead, after lifting, it will be lowered again with section 20 carrying three previously hung pallets. Thus, the four pallets are removed as a stack as was alreday described.

Therefore, it can be seen that only every fourth pallet in reality, together with others, leaves the stacking station to the left, loaded with three others. This is the reason that a common return path, such as 7 in FIG. 1, can readily be fed by four such stacking stations.

It can further be seen that the unstacking station is constructed basically similarly. Actually the FIG. 4 can be interpreted as an unstacking station. In such a situation, a stack arrives from the right, such as on section 26. The stack is lifted by section 20, until the penultimate pallet hangs in the pawls. The section 20 is then lowered, but the penultimate pallet remains suspended by the pawls, carrying two others. The lowest pallet of the arriving stack, which just had carried three other pallets, is lowered with the section 20, but now by itself, and after section 20 is again in alignment with the roller track 25, that pallet rolls off by itself. The section 20 is lifted again until the now lowest one of the three pallet stack is seated on the section 20. It is slightly lifted, the pawls are briefly turned out of the way but swing back quickly to hold the lower one of the two pallets that remain in the stack. The other pallet remains seated on the section 20, which is lowered therewith, that pallet rolls off, etc.

It can readily be seen that by stepwise lifting and lowering section 20 in combination with timed pivoting of the pawls, pallets are sequentially unstacked, and send on their way to the loading station that now is expected to be located right next to the unstacking station, as was explained above with reference to FIGS. 1, 2 and 3.

Another modification is already illustrated in FIG. 4. The dotted lines indicate an alternative position for section 25, to demonstrate that section 20 can be made to operate in two different levels, and, thereby, take care of a level change in the roller track as a whole. Arriving pallets (or stacks) are rolled onto the section 20 in the level of the arriving roller track section 26, whereas any pallet or stack leaving section 20 is to be rolled off onto a lower level roller track section. Thus, the lifting section 20 is to be lowered into alignment with the lower level position of the continuing portion 25, as illustrated in dotted lines.

Another modification is also discernable from the Figure. Actually, the entire roller bed section 20 has to be lowered or lifted only, if, in fact, a level change of the conveyor track as a whole is desired, and is to be incorporated in the stacking and/or unstacking system. If no such level changes are necessary, simple lifting rods 27 or the like may be provided, reaching through the rolls in section 20 which by itself remains stationery. The lifting rods 27 may hold bars 28 that extend transversely to the plane of the drawing to engage the pallet runners transversely for lifting the pallets. The pallet bottom may be removable and should not be gripped directly (see copending application, Ser. No. 225,057). Since the pallets are empty at that point and are not very heavy, even if stacked as compared with the roller bed 20. The power neded for such lifting operation is significantly less than required in case of lifting an entire roller bed with pallets.

The invention is not limited to the embodiments described above but all changes and mofications thereof not constituting departures from the spirit and scope of the invention are inteded to be included.

We claim:

1. Conveyor system with plural branches and return portions for operation in an overall closed loop configuration, there being pallets on the conveyor system circulating in the closed loop and receiving individual items of load to be transported, the conveyor system having individual loading stations for pallets and unloading stations for loaded pallets, from which the empty pallets return to the loading stations; the improvement comprising:

the closed loop including a portion of the conveyor system that is common for return of pallets for several of the unloading stations to several of the loading stations;

a plurality of pallet stacking stations respectively disposed behind unloading stations for feeding stacks of empty pallets into that common portion; and a plurality of pallet unstacking stations repsectively disposed in front of the loading stations, and each for receiving stacks of empty pallets and unstacking them for individual availability of empty pallets in the respective loading station, so that only loaded pallets circulate in the system, loaded either with load proper or with other, empty pallets.

2. Conveyor system as in claim 1, the stacking station for stacking three or four empty pallets onto another one.

3. Conveyor system as in claim 1, the stacking and unstacking stations each extending over a conveyor system section of about the length of a pallet and including first means for lifting the pallet and second means for gripping a pallet to suspend a pallet above the track, whereby one or several stacked pallets can be suspended, the second means operable to release a pallet or pallets as suspended for lowering by the first means.

4. Conveyor system as in claim 3, the first means including the section itself.

5. Conveyor system as in claim 3, the first means including several lifting means.

* * * * *